(12) United States Patent
Hu et al.

(10) Patent No.: US 8,035,704 B2
(45) Date of Patent: Oct. 11, 2011

(54) METHOD AND APPARATUS FOR PROCESSING A DIGITAL IMAGE HAVING DEFECTIVE PIXELS

(75) Inventors: Shane C. Hu, Fremont, CA (US); Robert Mullis, Soquel, CA (US)

(73) Assignee: Aptina Imaging Corporation, George Town (KY)

( * ) Notice: Subject to any disclaimer, the term of this patent is extended or adjusted under 35 U.S.C. 154(b) by 952 days.

(21) Appl. No.: 12/003,922

(22) Filed: Jan. 3, 2008

(65) Prior Publication Data
US 2009/0174797 A1    Jul. 9, 2009

(51) Int. Cl.
*H04N 9/64* (2006.01)
(52) U.S. Cl. ...................................... 348/246
(58) Field of Classification Search .................. 348/246, 348/247, 273
See application file for complete search history.

(56) References Cited

U.S. PATENT DOCUMENTS

| | | | |
|---|---|---|---|
| 6,989,862 B2 | 1/2006 | Baharav et al. | |
| 7,015,961 B2 | 3/2006 | Kakarala | |
| 7,030,917 B2 | 4/2006 | Taubman | |
| 7,088,392 B2 | 8/2006 | Kakarala et al. | |
| 7,366,347 B2 * | 4/2008 | Song et al. | 382/162 |
| 7,715,617 B2 * | 5/2010 | Nishio et al. | 382/149 |
| 2003/0222995 A1 * | 12/2003 | Kaplinsky et al. | 348/247 |
| 2004/0051798 A1 | 3/2004 | Kakarala et al. | |
| 2004/0085458 A1 | 5/2004 | Yanof et al. | |
| 2005/0099516 A1 * | 5/2005 | Kagle et al. | 348/246 |
| 2005/0201616 A1 | 9/2005 | Malvar et al. | |
| 2005/0244052 A1 | 11/2005 | Keshet et al. | |
| 2005/0280725 A1 * | 12/2005 | Spampinato et al. | 348/272 |
| 2006/0017826 A1 * | 1/2006 | Sekimoto et al. | 348/246 |
| 2006/0082675 A1 * | 4/2006 | McGarvey et al. | 348/362 |
| 2006/0104537 A1 | 5/2006 | Edgar | |
| 2006/0140507 A1 | 6/2006 | Ohki | |
| 2006/0226337 A1 | 10/2006 | Lim et al. | |
| 2006/0239580 A1 | 10/2006 | Dierickx | |
| 2006/0290711 A1 | 12/2006 | Milanfar et al. | |
| 2007/0109430 A1 | 5/2007 | Staelin et al. | |
| 2007/0133902 A1 | 6/2007 | Kumar | |
| 2007/0146511 A1 | 6/2007 | Kinoshita et al. | |
| 2007/0165124 A1 * | 7/2007 | Richardson | 348/294 |
| 2007/0183681 A1 | 8/2007 | Li et al. | |
| 2007/0189603 A1 | 8/2007 | Kasperkiewicz et al. | |
| 2008/0056607 A1 * | 3/2008 | Ovsiannikov | 382/275 |
| 2009/0027727 A1 * | 1/2009 | Ovsiannikov | 358/1.17 |
| 2009/0091645 A1 * | 4/2009 | Trimeche et al. | 348/273 |

FOREIGN PATENT DOCUMENTS

EP    1 650 979 A1    4/2006
(Continued)

OTHER PUBLICATIONS

Hirakawa, Keigo et al., "Joint Demosaicing and Denoising", Cornell University, Ithaca, NY, USA, Image Processing, IEEE Transactions, Aug. 2006, vol. 15, Issue 8, pp. 2146-2157, http://ieeexplore.ieee.org/search/srchabstract.jsp?arnumber=1658081&isnumber=34713&punumber=83&k2dockey=1658081@ieeejrns&query=%28%28hot+pixel%3Cand%3Ebayer%29%3Cand%/3Edemosaicing%3Cin%3Emetadata%29&pos=0.

(Continued)

*Primary Examiner* — Jason Chan
*Assistant Examiner* — Gary C Vieaux
(74) *Attorney, Agent, or Firm* — David C. Kellogg (57) ABSTRACT

A method and apparatus for image processing which performs pixel defect correction and color demosaicing on pixel image data while held in a line buffer.

13 Claims, 4 Drawing Sheets

FOREIGN PATENT DOCUMENTS

| JP | 2005-328215 | 11/2005 |
|---|---|---|
| WO | WO 2007/089519 A1 | 8/2007 |

OTHER PUBLICATIONS

Hirakawa, Keigo et al., "An Emperical Bayes Em-Wavelet Unification for Simultaneous Denoising, Interpolation, and/or Demosaicing", Dept. of Stat., Harvard University, Cambridge, MA, Image Processing, 2006 IEEE International Conference, Oct. 8-11, 2006, pp. 1453-1456, http://ieeexplore.ieee.org/search/srchabstract.jsp?arnumber=4106814&isnumber=4106440&punumber=4106439&k2dickey=410814@ieeecnfs&query=%28+demosaicing%3Cin%3Eab+%29&pos=2.

Tajbakhsh, Touraj et al., "Combined Demosaicing and Adaptive Filtering on CFA Images", Hamburg University of Technology, Consumer Electronics, ISCE '06, 2006 IEEE Tenth International Symposium, pp. 1-6, http://ieeexplore.ieee.org/search/srchabstract.jsp?arnumber=1689422&isnumber=35627&punumber=11112&k2dockey=1689422@ieeecnfs&query=%28+demosaicing%3Cin%3Eab+%29&pos=1.

Introduction to Maxim DL, Q Links—skywatcher.co.kr, http://66.102.1.104/scholar?hl=en&Ir=&q=cache:H5DnG7IfvIJ:www.skywatcher.co.kr/community/mart5/bbs/table/commu2/upload/4757__Maxim%2520DL__manual__A.pdf+Bayer+noise+%22hot+pixel%22+%22low+cost%22+processing.

* cited by examiner

METHOD AND APPARATUS FOR PROCESSING A DIGITAL IMAGE HAVING DEFECTIVE PIXELS

FIELD OF THE INVENTION

Embodiments relate to a method, apparatus and system for the spatial processing of a digital image.

BACKGROUND

Figure 1:
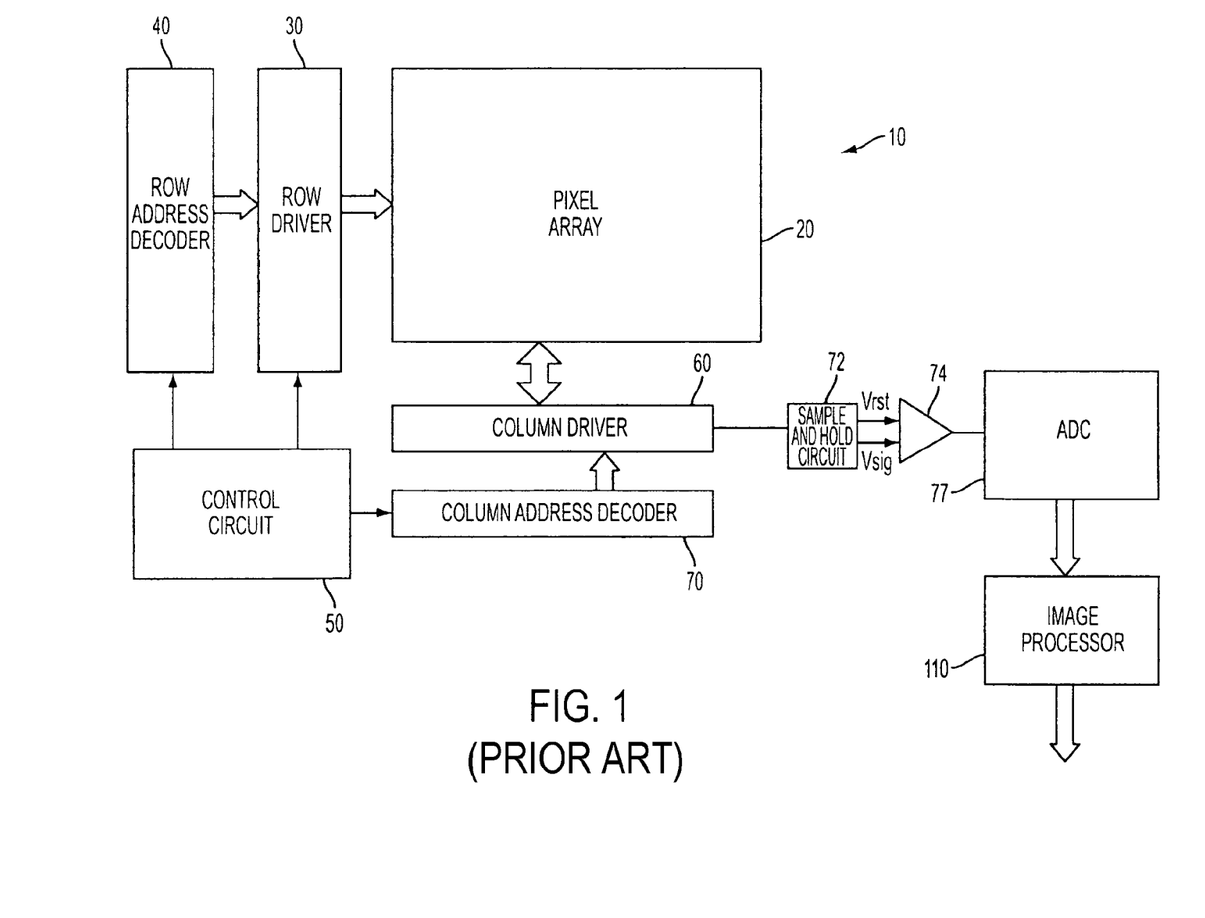
FIG. 1 is a simplified block diagram of an imaging device.

An imaging device 10, as shown in FIG. 1, typically includes a plurality of imaging device pixel cells, each having an associated photosensor, arranged in an array 20. FIG. 1 illustrates a CMOS imaging device 10 which employs a column parallel readout to sample the signals generated by the imaging device pixel cells. In a column parallel readout, a column switch associated with a column driver 60 and associated column address decoder 70 for each column of the array selectively couples a column output line to a readout circuit while a row of the array is selected for readout by row address decoder 40 and row driver 30.

A control circuit 50 typically controls operation of the pixel cells of the array 20 for image charge integration and signal readout. Each imaging device pixel cell in a CMOS imaging device 10 is sampled for a reset output signal (Vrst) and a photogenerated voltage output signal (Vsig) proportional to incident light from a scene to be captured. The output signals are sent to the readout circuit which processes the imaging device pixel cell signals. The readout circuit typically includes a sample and hold circuit 72 for sampling and holding the reset output signal Vrst and photogenerated output signal Vsig, a differential amplifier 74 for subtracting the Vrst and Vsig signals to generate a pixel output signal (e.g., Vrst−Vsig), and an analog-to-digital converter (ADC) 77, which receives the analog pixel output signal and digitizes it. The output of the analog-to-digital converter 77 is supplied to an image processor 110, which processes the pixel output signals from array 20 to form a digital image.

A color filter array may be used to detect separate color components of a scene to be captured so that the imaging device 10 may successfully reflect color details in a digitally produced color image. When a color filter array is placed over the pixel array 20, each imaging device pixel cell receives light through a respective color filter of the color filter array and detects only the color of its associated filter.

Figure 2:
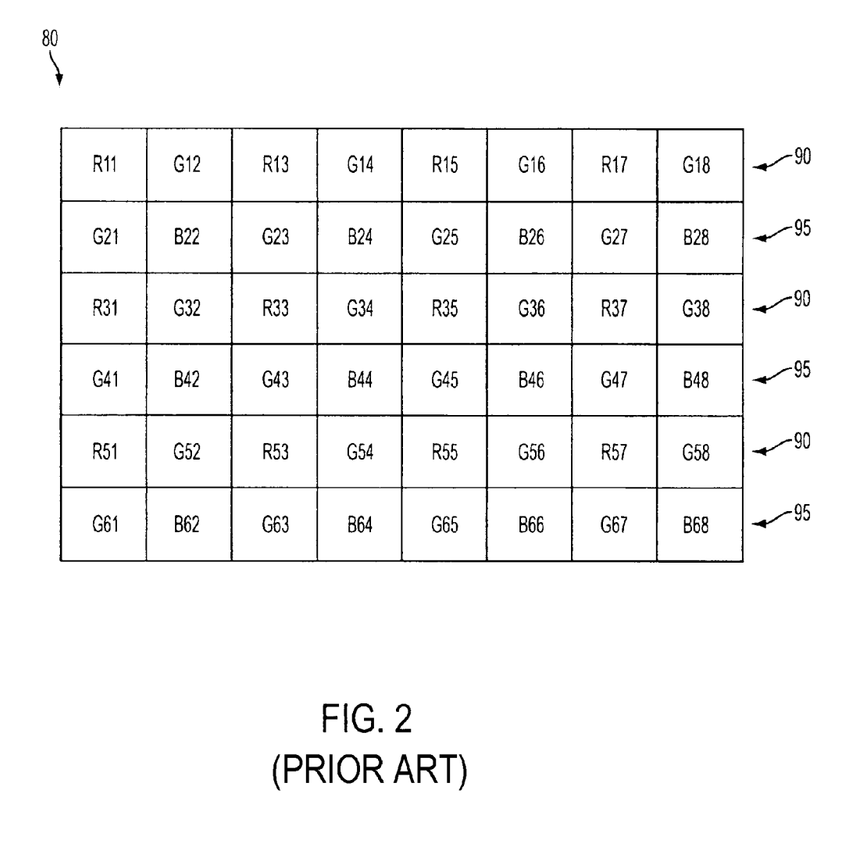
FIG. 2 is a Bayer patterned color filter array.

A Bayer patterned color filter array 80, illustrated in FIG. 2, is a well known and commonly used color filter array that allows the passage of only red, green, or blue light. Imaging device pixels in an array 20 associated with a Bayer patterned color filter array 80 may be designated as red (R), green (G), or blue (B) pixels according to each pixel's associated filter. Color filters in a Bayer patterned color filter array 80 are arranged in a pattern of alternating rows 90, 95, 90, 95, etc., with each row having alternating colors, i.e., R,G,R,G,R,G, etc. in rows 90 and G,B,G,B,G, etc. in rows 95.

The digital image output of the imaging device 10 using a Bayer patterned color filter array 80 is initially an array of red, green and blue image pixels, where "pixels" refers to individual picture elements that together comprise a digital image. Each pixel value is proportional to the intensity of the respective incident light from the captured scene as received by the imaging device pixel cell through an associated filter. This initial red/green/blue image is referred to as a "raw" image. A number of image processing tasks are required to transform a raw image into an image of a quality that accurately reflects the target scene by human visual standards.

Spatial processing tasks are a type of processing applied to raw image data which acquires pixel values from several pixels in a row or column of an image. Spatial processing includes color mosaic interpolation (i.e., demosaicing), pixel defect correction, image contrast enhancement, and image noise reduction, among other processing tasks. These tasks generally require the use of a plurality of line buffers to store lines of pixel values of the image so that proximal pixel values may be used in various processing calculations. Typically, the line buffers sequentially receive and store lines of pixel values in an image and these pixel values are processed while in the line buffer. Process lines of pixels exit each line buffer as a new next line of unprocessed pixel values are stored.

A line buffer stores a complete row or column of pixel values. Typically, as many as five or more separate line buffers may be used in spatial processing tasks. In a "camera-on-a-chip" implementation, the number of buffers occupies a significant portion of the silicon area used in the chip, which can be a problem due to cost and space limitations.

It is desirable to reduce the required number of line buffers for spatial processing tasks. It is also desirable for the spatial processing tasks to be efficient, low-cost and simple. What is needed is a spatial processing method that requires fewer line buffers and provides increased efficiency and decreased complexity of the spatial processing operations used to achieve, for example, defective pixel correction, interpolation, contrast enhancement and noise reduction.

DETAILED DESCRIPTION OF THE INVENTION

In the following detailed description, reference is made to the accompanying drawings which form a part hereof, and which illustrate specific embodiments. These embodiments are described in sufficient detail to enable those of ordinary skill in the art to make and use them. It is also understood that structural, logical, or procedural changes may be made to the specific embodiments disclosed herein.

As described above, the term "pixel" hereinafter refers to a single picture element in a digital image.

The term "pixel cell" hereinafter refers to a photosensitive cell in an imaging device pixel array.

Figure 3:
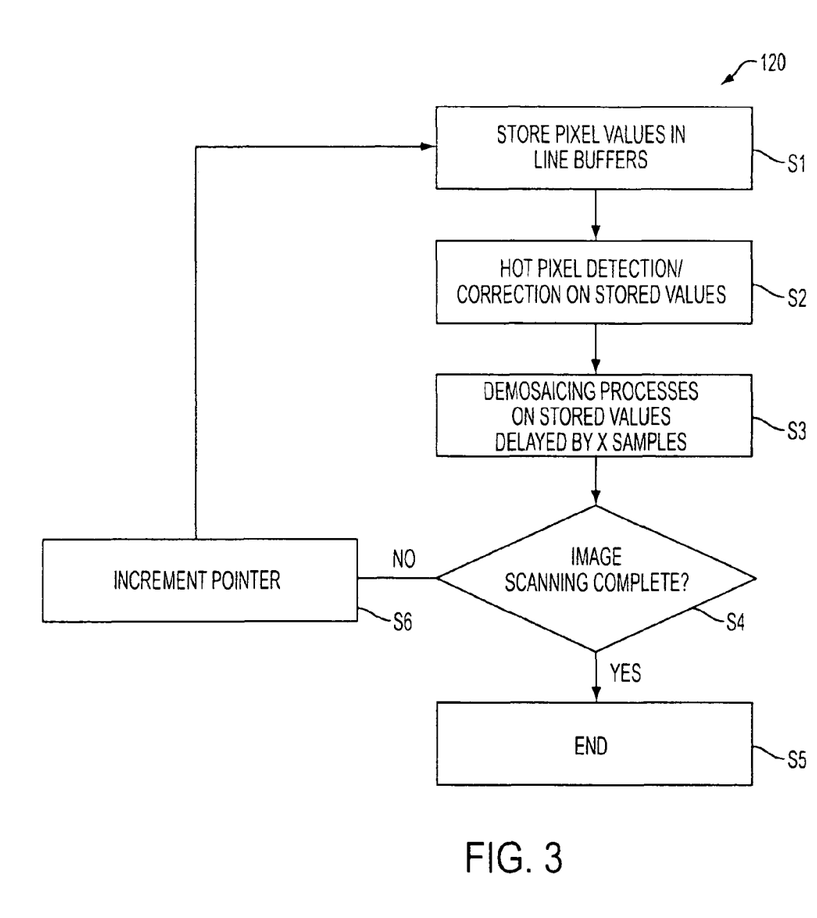
FIG. 3 is a flowchart illustrating an embodiment of a method of operating an imaging device.
Figure 4:
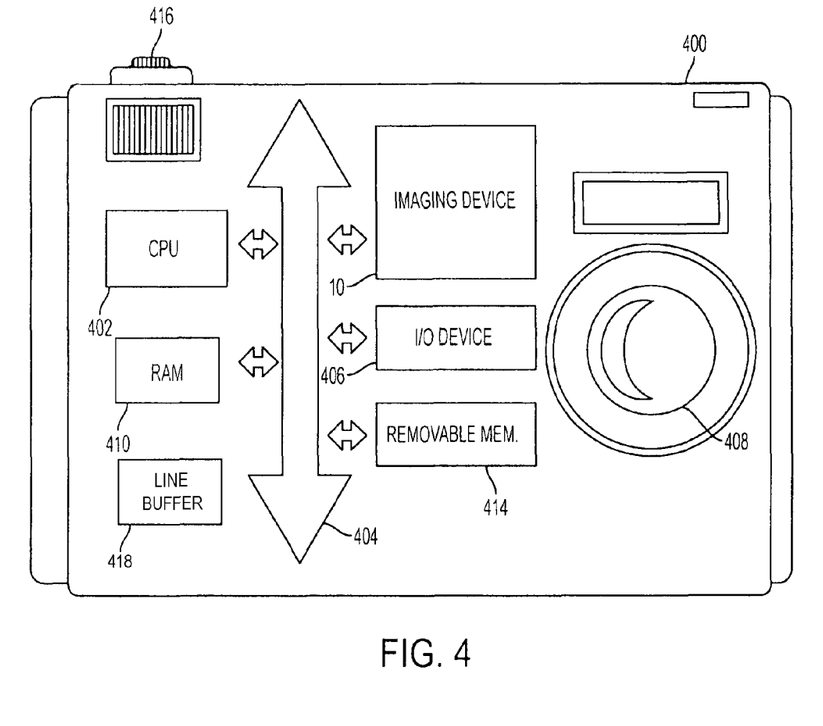
FIG. 4 is a system incorporating at least one imaging device configured to employ the method of FIG. 3.

Embodiments discussed herein use the same line buffers for multiple spatial processing tasks. An illustrative line buffer 418 is shown in FIG. 4. Referring to FIG. 3, a first embodiment of a spatial processing method 120 is now described. First, pixel values are stored in line buffers at step S1. The spatial processing method 120 continues with a progressive scanning of the stored data for defective pixel detection, for example, hot pixel detection, and correction at step S2. A demosaicing process is applied to pixels in the same line as the hot pixel correction process, delayed by a predetermined number of pixel data samples at step S3. The demosaicing process also incorporates noise reduction and contrast enhancement tasks, as will be described further below. The processing of steps S1-S3 are repeated (steps S4, S6) until it is determined at step S4 that the scanning of all pixels of an image is complete (step S5).

At step S1, the storing of the pixel values in line buffers may be executed using three full line buffers, or may be executed through hardware optimization designed to realize three effective line buffers while using only two full line buffers coupled with a fixed number of temporary storage cells and applied logic, or by using another equivalent method to realize three effective line buffers. It should be understood that any technique that provides for the storage of three effective lines of image pixel values may be used for the storage step. However, the invention could be employed with line buffers which store more than three effective lines of image pixel values. It should also be understood that although the line buffers are described as storing rows of pixels, the method may be applied by storing columns of pixels as well.

The defective pixel detection and correction process of step S2 is now described in more detail with reference to correcting defective hot pixels, although correction of other types of pixel defects may also be performed in addition to or in lieu of defective hot pixel correction. The process is described for an application to Bayer patterned sampled RGB images; however, it should be understood that the process may be applied to other color systems with appropriate substitutions of color. The following pseudo-code expresses the hot pixel detection and correction steps for a target green pixel G34 shown in the image portion depicted in FIG. 2:

| (Method 1: green pixel hot pixel detection and correction) |
| --- |
| Line 1: if ((G23 + G45)>(G25 + G43)) |
| Line 2: surround = G23 + G45; |
| Line 3: else |
| Line 4: surround = G25 + G43; |
| Line 5: if (G34 > surround) |
| Line 6: G34 = surround; |

A hot pixel typically exhibits high or excessive contrast in a digital image. In the first embodiment, to check whether a target pixel is a hot pixel, the target pixel is compared with local pixels of the same color from the rows directly above and beneath the target pixel. Excessive contrast may be determined if the target pixel exhibits a significantly higher value, preferably compared to the sum of diagonal neighboring pixels. In contrast to the typical hot pixel detection and correction method, there is no threshold value decision nor any complex computation required for the hot pixel detection and correction, which allows the embodiment to be implemented at low cost.

In method 1, where the target pixel is pixel G34, the neighboring same color pixels comprise pixels G23, G45, G25 and G43. The target pixel G34 is compared to a sum value of the diagonal neighboring pixels having the greater summed value. If excessive contrast is detected, marked by the target pixel value exceeding the greater of the summed values (surround), the target pixel G34 is determined to be a hot pixel (Lines 1-5). Correction may be executed by replacing the hot pixel value with a value which is calculated from the same neighboring pixels (Line 6). The replacement value calculated in the expression above is equal to the greater of the two sum values of the diagonal neighboring pixels, however, a proportional value, e.g., ½, of the greater of the two sum values may be used instead.

In a Bayer patterned sampled image, there are no red pixels in the row immediately above or immediately below a row containing red pixels. The same is true for blue pixels. Accordingly, the method for red or blue target pixel hot pixel detection uses the nearest neighboring same-color pixels in the same row, as expressed by the pseudo-code below for target pixels R35 and B44 (FIG. 2):

| (Method 2: red and blue hot pixel detection and correction) |
| --- |
| Line 1: if (R35 > (R33 + R37)) |
| Line 2: R35 = R33 + R37; |
| Line 3: if (B44> (B42 + B46)) |
| Line 4: B44 = B42 + B46; |

In method 2 the target pixels R35 and B44 are checked for excessive contrast by comparison to the sum of the two nearest neighboring pixels in the same row (Method 2, lines 1 and 3). If the target pixel value exceeds the sum value, the target pixel is determined to be a hot pixel and the pixel value is replaced with the sum value (Method 2, lines 2 and 4), or a proportional, e.g., ½, of the sum value.

Step S3 (FIG. 3) is now described in more detail. Step S3 comprises a demosaicing process applied to pixel signals in the line buffer which have already undergone defect corrections. The demosaicing process may also have integrated contrast enhancement and noise reduction. The demosaicing process is explained as operating on a Bayer patterned sampled image, but may be executed on images utilizing a different color system wherein appropriate color substitutions are made with respect to the method. Due to the differences in pixel color layout, the demosaicing process is applied differently to green target pixels than red or blue target pixels. The following pseudo-code expresses the demosaicing of a green target pixel cell G45 in a row 95 having green and blue pixels (FIG. 2):

| (Method 3: green target pixel demosaicing) |
| --- |
| Line 1: if (R55 >(R53 + R57)) |
| Line 2: temp_R55 = R53 + R57; |
| Line 3: else |
| Line 4: temp_R55 = R55; |
| Line 5: avg_g = calcAvg(G34, G36, G56, G54); |
| Line 6: avg_g = (G45 + avg_g) / 2; |
| Line 7: avg_r = (R35 + temp_R55) / 2; |
| Line 8: avg_b = (B44 + B46) / 2; |
| Line 9: avg_Y = calcLuminance(avg_r, avg_g, avg_b); |
| Line 10: Cg = avg_g − avg_Y; |
| Line 11: Cr = avg_r − avg_Y; |
| Line 12: Cb = avg_b − avg_Y; |
| Line 13: localY = G45 − Cg; |
| Line 14: dY = localSharpness(localY, avg_Y, sharpness, sharpnessBase, lumaThrShift, lumaThrBias); |
| Line 15: r = Cr + dY; |
| Line 16: g = Cg + dY; |
| Line 17: b = Cb + dY; |

As previously explained, each imaging device pixel cell detects a single color component of the captured scene. The demosaicing process interpolates missing color values for a target pixel from neighboring pixels. In method 3, the blue color value missing from the target green pixel G45 is calculated based on neighboring blue pixels B44 and B46, which are in the same row as the target pixel G45. The missing red color value is calculated based on neighboring red pixels R35 and R55, which are in the rows immediately above and below the target pixel row, respectively.

The hot pixel detection and correction process and the demosaicing process are both progressively applied through a scanning process across pixels held in a single line buffer. The demosaicing process is applied to a target pixel that is a number of pixel samples which follow pixels undergoing hot pixel detection and correction. Preferably, the demosaicing process is applied to pixels a distance of two pixels from the application of the hot pixel detection and correction process. Accordingly, the target pixel, neighboring pixels in the same row as the target pixel, and pixels in the row above the target pixel have already been checked for hot pixel defect, and, if necessary, corrected. For example, as the hot pixel detection and correction process is applied to each pixel in a row, when being applied to green pixel G36, the demosaicing process is applied to green pixel G34 (FIG. 2). Under this progression, the hot pixel detection and correction method is not yet applied to pixels in the row beneath the target pixel. The first step of the demosaicing process is to check the neighboring red pixel R55 in the row beneath the target pixel for hot pixel defect, and if necessary, store a temporary correction value temp_R55 for calculation purposes (Meth. 3, lines 1-4).

The average local green avg_g, red avg_r, and blue avg_b values are calculated next (Method 3, lines 5-8). The local average color values may be calculated as a median value, mean value, adjusted average or some other form of average. Preferably, the average blue value avg_b is equal to the average (mean) value of the two blue pixels B44, B46 located on either side of the target pixel (Method 3, line 8). Similarly, the average red value avg_r is preferably equal to the average of the red pixel R35 located in the row directly above the target pixel G45 row and the temporary stored hot pixel correction value temp_R55 representing the value of the red pixel R35 located in the row directly below the target pixel G45 (Method 3, line 7).

The calculation for the representative local green value avg_g is based on an average of the four nearest green pixels G34, G36, G56, G54. Due to the increased number of samples, a more comprehensive averaging technique is utilized to determine a representative value avg_g. The calculation method for determining an average local value where four local samples are available is expressed herein as a function calcAvg, which receives the four local values as input parameters and returns an output value (average). The function calcAvg may be designed in various ways, depending on the desired bias and form of average used. Preferably, calcAvg operates as expressed by the following pseudo-code:

---
(Method 4: calculate local average with four local values)
---
```
Line 1:    calcAvg(int p1, int p2, int p3, int p4) {
Line 2:       int d1, d2;
Line 3:       int average;
Line 4:       d1 = p1 - p3;
Line 5:       if(d1 < 0)
Line 6:          d1 = -d1;
Line 7:       d2 = p2 - p4;
Line 8:       if(d2 < 0)
Line 9:          d2 = -d2;
Line 10:      if(d1 < d2)
Line 11:         average = ((p1 + p3) * 3 + (p2 + p4) * 1) / 8;
Line 12:      else
Line 13:         average = ((p1 + p3)* 1 + (p2 + p4) * 3) / 8;
Line 14:      return(average);
Line 15:   }
```
---

The average value average as calculated above is biased towards the smoother diagonal pair of four like-colored proximal pixels, that is, biased towards the pair having the least variance. In this way, abnormally high contrast points or hard edges in the image are discounted. The variance of the first diagonal pair p1 and p3 is determined in method 4 lines 4-6. The variance of the second diagonal pair p2 and p4 is determined in method 4, lines 7-9. The pair having the least variance is accorded increased weight in calculating the average (Method 4, lines 10-13). The output value average is returned to the calling method.

Referring back to method 3, lines 5-6, the returned result representing local green average value average is averaged with the target pixel G45 value to determine a local average green value avg_g biased toward the target pixel G45.

Continuing in method 3, the next step is calculating the average local luminance (Method 3 line 9). The average green (avg_g), red (avg_r) and blue (avg_b) values calculated above may be used as parameters to calculate the average local luminance. Various methods may be used to calculate the average luminance. To simplify the demosaicing process, the average green value calculated above may be used as an approximation of average luminance. This is particularly viable in a Bayer sampled image, as green is the most represented color sample. In this case, calcLuminance returns avg_g, which will accordingly be used as a representation of average luminance avg_Y going forward. It should be understood that local luminance may be calculated in different ways and the use of avg_g is not intended to be limiting.

Next, in method 3, lines 10-13 red, green and blue color difference values Cr, Cg, Cb are calculated by subtracting the average luminance value avg_Y from each of the local average values avg_g, avg_r, avg_b. A local luminance value localY is defined at method 3, line 13, as the difference between the target pixel G45 value and the green color difference value Cg. The color difference values and local luminance value are all used to calculate a sharpness parameter dY (Method 3, line 14).

The sharpness parameter dY is determined by a localSharpness process. The basic operation of localSharpness is to stretch the effect of the local luminance with respect to the surrounding pixel values and to perform noise reduction if the local contrast is below a certain noise floor. The localSharpness process is preferably executed as expressed by the following pseudo-code:

---
(Method 5: sharpness and noise reduction)
---
```
Line 1:   localSharpness(int localY, int avg_Y, int sharpness,
int sharpnessBase, int thrShift, int thrBias) {
Line 2:      int diff, temp, sign;    // integer variables
Line 3:      diff = localY - avg_Y;
Line 4:      if(diff < 0) {
Line 5:         diff = -diff;
Line 6:         sign = 1;
Line 7:      } else
Line 8:         sign = 0;
Line 9:      temp = diff - ((avg_Y >> thrShift) + thrBias);
Line 10:     if(temp < 0)
Line 11:        temp = 0;
Line 12:     else {
Line 13:        temp *= sharpness;
Line 14:        temp /= sharpnessBase;
Line 15:     }
Line 16:     if(sign)
Line 17:        temp = -temp;
Line 18:     return(temp + avg_Y);
Line 19:  }
```
---

The parameters sharpness and sharpnessBase are parameters for adjusting the resolution of the image. These parameters also affect the amount of contrast boost the image will receive and may be configured to be controllable by the user or preset by the manufacturer.

The parameters threshold thrshift and thrBias are used to determine the amount of contrast boost and to control noise reduction. The thrShift parameter is a signal-dependent proportional parameter that may be adjusted according to the quality of the image sensor. The higher the quality of the image sensor, the higher the thrShift parameter may be set. The thrBias parameter is used to specify a constant noise floor offset value. This parameter may be scaled by the user in accordance with the analog gain of the image sensor to set an appropriate noise floor.

In operation, first the difference diff between the local luminance localY and the average luminance avg_Y is determined in method 5, lines 3-8. At line 9, a temporary estimation of a noise value temp is calculated based on diff, avg_Y, thrshift and thrBias. If the temporary noise value temp is below the noise floor, the average luminance avg_Y is returned as the sharpness parameter dY at line 18. If the temporary noise value is above the noise floor, the sharpness parameters sharpness and sharpnessBase are applied to adjust the temp value. The temp value is added to the average luminance avg_Y and the sum value returned as the sharpness parameter dy. Accordingly, method 5 operates to check and adjust for noise reduction prior to adjusting sharpness or contrast.

Referring back to method 3 (green target pixel demosaicing), the final red, green and blue output values for the target pixel are determined by adding the sharpness parameter dy to the color difference value for each respective color, Cr, Cg, and Cb at method 3, lines 15-17. A similar process may be used for a target green pixel in a line of pixels containing green and red pixels.

The following pseudo-code describes the process for demosaicing a red pixel, for example R35, in a line of pixels containing red and green pixels:

---
(Method 6: red target pixel demosaicing)

```
Line 1:   avg_r = calcC3Avg(R33, R35, R37);
Line 2:   avg_g = calcAvg(G34, G25, G36, G45);
Line 3:   avg_b = calcAvg(B24, B26, B46, B44);
Line 4:   avg_Y = calcLuminance(avg_r, avg_g, avg_b);
Line 5:   Cg = avg_g - avg_Y;
Line 6:   Cr = avg_r - avg_Y;
Line 7:   Cb = avg_b - avg_Y;
Line 8:   localY = R35 - Cr;
Line 9:   dY = localSharpness(localY, avg_Y, sharpness,
      sharpnessBase, lumaThrShift, lumaThrBias);
Line 10:  r = Cr + dY;
Line 11:  g = Cg + dY;
Line 12:  b = Cb + dY;
```
---

Similar to the demosaicing process described in method 3 above, the demosaicing process of method 6 is applied to a target pixel (R35) that is a number of pixel samples following the application of the hot pixel correction. Although hot pixel detection has not yet been applied at this point to pixels in the row beneath the target pixel, which in this example would include pixels B44, G45 and B46, it is not necessary to check for hot pixel defect in these pixels. The calcAvg method (Method 4) described above is biased against abnormally high contrast, therefore potential hot pixels would be sufficiently discounted.

Referring to method 6, the average local red pixel value avg_r is calculated at line 1 based on the neighboring red pixels R33 and R37. The calcC3Avg method returns an average value of three input pixel values, which may be biased toward the target pixel R35 (p2), as shown below:

---
(Method 7: calculate average, three pixels, same row)

```
Line 1:   calcC3Avg(in p1, int p2, int p3) {
Line 2:   int high, low, tmp1, tmp3, average;
Line 3:     low = p2>>2;
Line 4:     high = p2 + p2 - low;
Line 5:     if (p1>high)
Line 6:       tmp1 = high;
Line 7:     else if (p1<low)
Line 8:       tmp1 = low;
Line 9:     else
Line 10:      tmp1 = p1;
Line 11:    if (p3>high)
Line 12:      tmp3 = high;
Line 13:    else if (p3<low)
Line 14:      tmp3 = low;
Line 15:    else
Line 16:      tmp3 = p3;
Line 17:    average = ((p2 * 2) + tmp1 + tmp3) / 4;
Line 18:    return(average);
```
---

In lines 3-16 the neighboring pixel values R33 and R37 (p1 and p3, respectively) are checked against high and low limit values (high and low). The high and low limit values are defined as proportional to the target pixel R35 (p2) at lines 3 and 4. If the R33 or R37 pixel value is higher than the upper limit value, then the limit upper limit value is used to calculate the average. If the R33 or R37 pixel value is lower than the lower limit value, then the lower limit value is used to calculate the average. If the R33 or R37 pixel value is in between the upper and lower limit, then the R33 or R37 pixel value is used to calculate the average. The accuracy of the calculated average value may therefore be increased by limiting overshooting or undershooting pixel values where a sharp transition occurs between pixels in an image.

Referring back to method 6, the average local blue avg_b and average local green avg_g values are determined next in lines 2-3, using the previously described calcAvg method (Method 4). Average luminance avg_Y is determined next as previously described and used to calculate the color difference values Cr, Cb, Cg. A local luminance value localY is calculated based on a difference between the target pixel value and the red color differential value. A sharpness parameter dY is calculated using the localsharpness method described above. The sharpness parameter is added to each color differential value respectively to produce the final adjusted output. A target blue pixel may be demosaiced in a similar fashion.

The above described spatial processing method 120 requires one line buffer storing three effective lines to perform hot pixel correction, demosaicing, contrast enhancement, and noise reduction and may be implemented in various image processing systems. The processing described herein can be performed by an on-chip image processor 110, as shown in FIG. 1, or by a separate processor which receives the pixel information.

FIG. 4 shows an image processor system 400, for example, a still or video digital camera system, which may implement a demosaicing process in accordance with embodiments described herein. The imaging device 10 may receive control or other data from system 400. The imaging device 10 receives light on pixel array 20 thru the lens 408 when shutter release button 416 is pressed. System 400 includes a processor 402 having a central processing unit (CPU) that communicates with various devices over a bus 404, including with imaging device 10. Some of the devices connected to the bus 404 provide communication into and out of the system 400, such as one or more input/output (I/O) devices 406 which may include input setting and display circuits. Other devices connected to the bus 404 provide memory, illustratively including a random access memory (RAM) 410, and one or more peripheral memory devices such as a removable, e.g., flash, memory drive 414. The imaging device 10 may be constructed as shown in FIG. 1. The imaging device 10 may, in turn, be coupled to processor 402 for image processing, or other image handling operations. Examples of processor based systems, which may employ the imaging device 10, include, without limitation, computer systems, camera systems, scanners, machine vision systems, vehicle navigation systems, video telephones, surveillance systems, auto focus systems, star tracker systems, motion detection systems, image stabilization systems, and others.

While embodiments have been described in detail, it should be readily understood that the claimed invention is not limited to the disclosed embodiments. Rather the embodiments can be modified to incorporate any number of variations, alterations, substitutions or equivalent arrangements not heretofore described. Accordingly, the invention is not limited by the foregoing description but is only limited by the scope of the attached claims.

What is claimed as new and desired to be protected by Letters Patent of the United States is:

1. A method of processing an image, the method comprising:
    storing pixel information of a portion of the image in a line buffer capable of storing multiple lines of pixel information, wherein each pixel information relates to a single color;
    determining whether a target pixel in the portion of the image stored in the line buffer is defective;
    adjusting a value of the target pixel if it is determined to be a defective pixel; and
    adjusting the target pixel value to interpolate color values containing a plurality of color components through an interpolation process using the pixel information stored in the line buffer, wherein a pixel is determined to be defective by detecting high contrast in a target pixel with respect to proximal like-colored pixels within the portion of the image and wherein high contrast is detected by:
        determining a first sum value from output values of a first set of pixels proximal to the target pixel;
        determining a second sum value from output values of a second set of pixels proximal to the target pixel, wherein pixels in the second set of pixels is exclusive of pixels in the first set of pixels; and
        comparing the target pixel value to the greater of the first and second sum values.

2. The method of claim 1, wherein the interpolation process comprises adjusting the target pixel value to enhance the image contrast and to reduce noise in the image based on predefined parameters.

3. The method of claim 1, wherein the portion of the image comprises three rows of pixels.

4. The method of claim 1, wherein the portion of the image comprises three columns of pixels.

5. The method of claim 1, further comprising adjusting the target pixel value to at least a value related to the greater sum value when the target pixel value exceeds the greater sum value.

6. The method of claim 1, wherein the identified defective pixels are corrected by replacing the target pixel value with a value calculated based on proximal like-colored pixel values.

7. A method of processing an image, the method comprising:
    storing pixel information of a portion of the image in a line buffer capable of storing multiple lines of pixel information, wherein each pixel information relates to a single color;
    determining whether a target pixel in the portion of the image stored in the line buffer is defective;
    adjusting a value of the target pixel if it is determined to be a defective pixel; and
    adjusting the target pixel value to interpolate color values containing a plurality of color components through an interpolation process using the pixel information stored in the line buffer; wherein the interpolation process comprises:
        determining whether pixels that are in the proximity of the target pixel which have not yet been checked for defect are defective;
        storing a temporary adjusted value for each identified proximal defective pixel for use in the target pixel interpolation;
        calculating a local average color value for each color collected by same color pixels in a locality of the target pixel, using the temporary adjusted value for a pixel;
        calculating a local average luminance value in the locality of the target pixel; and
        calculating interpolated color values for the target pixel, where the value for each color is adjusted to enhance image sharpness based in part on the local average color value and the local average luminance value.

8. The method of claim 7, wherein the local average color value is calculated based on the target pixel value and a first number of local pixel values when the target pixel represents a first color, and on the target pixel value and a second number of local pixel values when the target pixel represents a second color.

9. The method of claim 8, wherein the first number of local pixel values is three, and the second number of local pixel values is two.

10. A method of processing an image comprised of an array of pixel values, each pixel value representing a single color, the method comprising:
    storing pixel values of a first line of pixels of the image, a second line of pixels of the image and a third line of pixels of the image, where the second line of pixels is in between and adjacent to the first and third lines of pixels;
    analyzing the stored pixel values of pixels in the second line of pixels to identify whether any pixel is a defective pixel;
    calculating a corrected pixel data value for any pixel identified as a defective pixel;
    storing the corrected pixel data value in place of the defective pixel data value; and
    applying a demosaicing process to pixels in the second line that have been analyzed for defective pixel determination and correction, the demosaicing process also enhancing the contrast of the image and reducing the effects of pixel noise in the image, wherein the demosaicing process comprises:
        calculating a local average color value for each color collected by the pixels in a locality of the target pixel;
        calculating a local average luminance value in the locality of the target pixel; and
        calculating a value for the target pixel for each color collected by the pixels, where the value for each color is adjusted based in part on the local average color value and local average luminance value.

11. The method of claim 10, wherein the pixel values are stored in a three line buffer.

12. The method of claim 10, wherein the pixel values are stored in a two line buffer and associated storage circuits.

13. The method of claim 10, wherein the defective pixels are hot pixels and wherein the identification of hot pixels comprises comparing a target pixel value to sum values calculated from four neighboring pixel values when the target pixel represents a first color, and comparing the target pixel value to a sum value calculated from two neighboring pixel values when the target pixel represents a second color.

* * * * *